United States Patent [19]

Wepfer et al.

[11] Patent Number: 5,713,412
[45] Date of Patent: Feb. 3, 1998

[54] APPARATUS FOR ATTENUATING VIBRATION OF A TUBULAR MEMBER

[75] Inventors: Robert M. Wepfer, Export; Thomas M. Frick, North Huntingdon, both of Pa.

[73] Assignee: Westinghouse Electric Corporation, Pittsburgh, Pa.

[21] Appl. No.: 645,374

[22] Filed: May 13, 1996

[51] Int. Cl.$^6$ .................................................. F28F 7/00
[52] U.S. Cl. ................................. 165/69; 165/162; 138/30
[58] Field of Search ....................... 138/114, 30; 165/69, 165/162

[56] References Cited

U.S. PATENT DOCUMENTS

| | | | |
|---|---|---|---|
| 4,285,396 | 8/1981 | Schwoerer et al. | 165/69 X |
| 4,431,469 | 2/1984 | Falcomato | 138/114 X |
| 4,590,991 | 5/1986 | Cooper, Jr. et al. | 165/69 |
| 4,653,576 | 3/1987 | Lagally | 165/69 |
| 4,936,378 | 6/1990 | Kaithoff et al. | 165/69 |
| 5,158,162 | 10/1992 | Fink et al. | 188/378 |
| 5,285,843 | 2/1994 | Dierbeck | 165/69 |
| 5,449,152 | 9/1995 | Byrnes et al. | 267/153 |
| 5,464,442 | 11/1995 | Burt et al. | 623/27 |

*Primary Examiner*—John Rivell
*Assistant Examiner*—Christopher Atkinson

[57] ABSTRACT

Apparatus for attenuating vibration of a tube includes a cable disposed in the tube and spaced-apart attenuating assemblies mounted on the cable for frictionally engaging the wall of the tube in order to damp vibration of the tube. The assemblies also add rigidity to the tube in order to stabilize the tube against vibration. Each attenuating assembly comprises two spaced-apart end fittings mounted on the cable. A heat vaporizable insert is interposed between the end fittings for maintaining the end fittings in their spaced-apart relationship until the insert vaporizes. A preloaded coiled spring, which interconnects the end fittings and surrounds the insert, biases the end fittings towards each other after the insert vaporizes. A tubular, flexible and braided sheath, which is interposed between the end fittings, surrounds the spring and has respective ends thereof attached to the end fittings. When the insert vaporizes, the spring biases the end fittings closer together, thereby axially shortening the sheath. The braided sheath radially expands as it axially shortens and frictionally contacts the inner wall of the tube to damp the tubular member's vibration. Moreover, the presence of the attenuating assembly in the tube adds rigidity to the tube for stabilizing the tube against vibration.

13 Claims, 9 Drawing Sheets

APPARATUS FOR ATTENUATING VIBRATION OF A TUBULAR MEMBER

BACKGROUND

This invention generally relates to apparatus for attenuating vibration of structures and more particularly relates to an apparatus for attenuating vibration of a tubular member, which tubular member maybe a heat transfer tube belonging to a nuclear steam generator.

Although devices for attenuating flow-induced vibration of tubular members have met with some success, it has been observed that these devices have a number of operational problems associated with them. However, before these problems can be appreciated, some background is necessary as to the mechanisms causing flow-induced vibration in tubular members.

In this regard, it is known that a structural member placed in a fluid flow field may experience strong and large oscillations or vibrations (ie., experience to and from motion) at a certain frequency of vibration (ie., number of completed cycles of oscillation per unit time) when the fluid cross-flow over the structural member is raised above a certain critical value (such value depending on geometry and member support conditions, and which, for some few members with poor support conditions may be exceeded under nominal design and flow conditions or, more likely, after some wear and accompanying loss of support has occurred at one or more sites because of unavoidable lower amplitude vibrations due to flow turbulence forces acting on the member during relatively long periods of prior operation). Also in this regard, adding a new structural member which, by its fundamental nature, significantly contributes to damping of the structural system (now comprised of both the original and new members) can produce the net effect of reducing, or, if the damping is made large enough, entirely eliminating the amplitude of said vibrations.

With particular reference to a nuclear reactor heat exchanger or steam generator, heated and radioactive primary fluid flows at high velocity through a plurality of heat transfer tubes as non-radioactive secondary fluid of lower temperature flows at high velocity along and across the exterior surfaces of the tubes. The wall of the tubes function as heat conductors for conducting heat from the primary fluid to the secondary fluid, which secondary fluid vaporizes to steam as the primary fluid heats the secondary fluid.

Occasionally, however, the previously mentioned high velocity of the secondary fluid will cause flow-induced vibration of the tubes such that the tubes may wear against internal structures (e.g., anti-vibration bars restraining the tubes) of the steam generator. Wear of the tubes against internal steam generator structures may lead to significant tube wall thinning and if severe enough may conceivably lead to a breach of the tube wall. This is undesirable because a breach of the tube wall may lead to commingling the radioactive primary fluid with the non-radioactive secondary fluid. Avoiding commingling of the radioactive primary fluid with the non-radioactive secondary fluid avoids radioactive contamination of secondary system components which are in fluid communication with the secondary fluid.

If a tube evinces wall thinning beyond a predetermined limit, due for example to fretting wear against the previously mentioned anti-vibration bars, it is removed from service by plugging the open ends of the tube. In this manner, the radioactive primary fluid can not enter the tube and commingle with the non-radioactive secondary fluid should the wall of the tube wear through.

However, even after the tube is removed from service, the tube may nonetheless continue to experience flow-induced vibration due to the relatively high velocity of the secondary fluid flowing along and across the exterior surface of the plugged tube. Such vibration may propagate or accelerate the previously mentioned wear and hence may create a risk that the thinned tube will sever at the locus of the thinning. A severed tube produces a free end portion thereof which may swirl or flail in the flowing fluid field and then violently impact neighboring undamaged tubes in which radioactive primary fluid is still flowing. If the wall of the neighboring tube is breached due to the impact of the severed tube end, then the radioactive primary fluid flowing in the neighboring tube may commingle with the non-radioactive secondary fluid, which is an undesirable result. It is therefore preferable to attenuate vibration of the thinned tube, so that it will not sever and damage neighboring tubes.

Therefore, it is to be appreciated that the flow-induced vibration effects recited hereinabove have safety and economic significance. In terms of safety, a severed tube may damage neighboring tubes in which primary fluid is still flowing, allowing the radioactive primary fluid to radioactively contaminate the non-radioactive secondary fluid. Contamination of the secondary fluid will cause radioactive contamination of normally uncontaminated secondary system components. This is undesirable from a safety standpoint and is to be avoided.

In terms of economics, if a vibrating tube becomes severed, the steam generator will have to be taken out of service and repaired. Taking the steam generator out of service entails shutting-down the nuclear reactor power plant associated with the steam generator. When the nuclear power plant is shut-down, replacement power is typically purchased by the electric utility operating the nuclear power plant in order to replace the power that otherwise would have been generated by the nuclear power plant. Replacement power may cost the electric utility approximately $300,000 each day the reactor power plant is shut-down in addition to the expenses required to repair or replace the steam generator. Hence, it is important to reduce the economic risk that the steam generator will be taken out of service due to a tube severed by flow-induced vibration. Consequently, from an economic standpoint, it is desirable to attenuate the vibration of the thinned tube even though the tube is plugged.

Tube stabilizers and dampers are known. A stabilizer device for reducing vibration in a tube in a heat exchanger is PTO-1449 disclosed by U.S. Pat. No. 4,590,991 issued May 27, 1986 in the name of Frank W. Cooper, Jr., et al. titled "Flexible Stabilizer For Degraded Heat Exchanger Tubing" and assigned to the Westinghouse Electric Corporation. The Cooper, Jr., et al. device is a flexible vibration stabilizer for reducing vibration in a degraded tube. The flexible stabilizer includes a flexible braided cable which carries a plurality of rigid members thereon, each of the rigid members having a nominal clearance between the member and the adjacent tube wall. According to this patent, vibration is reduced by mechanical interaction between the flexible cable and the adjacent tube wall or between the rigid members and the tube wall. However, this patent does not disclose a tube stabilizer that easily inserts into the mouth of the tube and thereafter adjusts to the diameter of the tube. Moreover, this device cannot be expected to dampen the tube significantly.

Therefore, what is needed is an apparatus for suitably attenuating vibration of a tubular member, which tubular member maybe a heat transfer tube belonging to a nuclear steam generator. Such vibration attenuation is particularly desirable in the U-bend region of the steam generator heat transfer tube.

SUMMARY OF THE INVENTION

Disclosed herein is an apparatus for attenuating vibration of a tubular member. The apparatus includes a cable disposed in the tubular member and a plurality of spaced-apart attenuating assemblies mounted on the cable for frictionally engaging the wall of the tubular member in order to damp vibration of the tubular member. The assemblies also add motion restraining capability, primarily in the form of damping, to the tubular member in order to limit the motion of the tubular member in vibration. Each attenuating assembly comprises two spaced-apart end fittings mounted on the cable. Interposed between the end fittings is a heat vaporizable insert for maintaining the end fittings in their spaced-apart relationship until the insert vaporizes. A preloaded coiled spring, which interconnects the end fittings and surrounds the insert, biases the end fittings towards each other after the insert vaporizes. A tubular, flexible and braided sheath, which is interposed between the end fittings, surrounds the spring and has respective ends thereof attached to the end fittings. When the insert vaporizes, the spring biases the end fittings closer together, thereby axially shortening the sheath. The braided sheath radially expands as it axially shortens and frictionally contacts the inner wall of the tubular member to damp the tubular member's vibration. Moreover, the presence of the attenuating assembly in the tube adds rigidity to the tube for stabilizing the tube against vibration. The ability of the assembly to remain elongated until radially expanded allows the assemblies to be easily inserted into the mouth of the tube. Moreover, the assemblies automatically adjust to the diameter of the tube after the sheath radially expands.

The invention in its broad form resides in an apparatus for attenuating vibration of a tubular member having an inner wall, comprising a cable capable of being disposed in the tubular member; a first end fitting mounted on the cable; a second end fitting mounted on the cable and spaced-apart from the first end fitting; heat vaporizable spacer means interposed between the first end fitting and the second end fitting for maintaining the first end fitting and the second end fitting in a spaced-apart relationship; biasing means attached to the first end fitting and the second end fitting for biasing the first end fitting and the second end fitting closer together; and a flexible sheath attached to the first end fitting and the second end fitting, the sheath surrounding the biasing means and the spacer means, whereby the spacer means vaporizes as the spacer means is heated, whereby the biasing means biases the first end fitting and the second end fitting closer together as the spacer means vaporizes, whereby the sheath axially shortens and radially expands to engage the inner wall of the tubular member as the first end fitting and the second end fitting are brought closer together, and whereby vibration of the tubular member is attenuated as the sheath engages the inner wall of the tubular member.

An object of the present invention is to provide an apparatus for attenuating vibration of a tubular member, which apparatus is configured robe easily insertable into the tubular member when in a radially unexpanded first position.

A feature of the present invention is the provision of a heat vaporizable insert, which when vaporized allows the attenuating assembly tom ore from the unexpanded first position to a radially expanded second position for contacting the inner wall of the tubular member.

An advantage of the present invention is that it can be easily inserted into the mouth of the tubular member and thereafter automatically expanded to contact the inner wall of the tubular member as the tubular member is heated.

Another advantage of the present invention is that it simultaneously acts as a dampner and a motion limiter for the tubular member.

These and other objects, features and advantages of the present invention will become apparent to those skilled in the art upon a reading of the following detailed description when taken in conjunction with the drawings wherein there is shown and described illustrative embodiments of the invention.

BRIEF DESCRIPTION OF THE DRAWINGS

While the specification concludes with claims particularly pointing-out and distinctly claiming the subject matter of the invention, it is believed the invention will be better understood from the following description, taken in conjunction with the accompanying drawings wherein:

DESCRIPTION OF THE PREFERRED EMBODIMENTS

Figure 1:
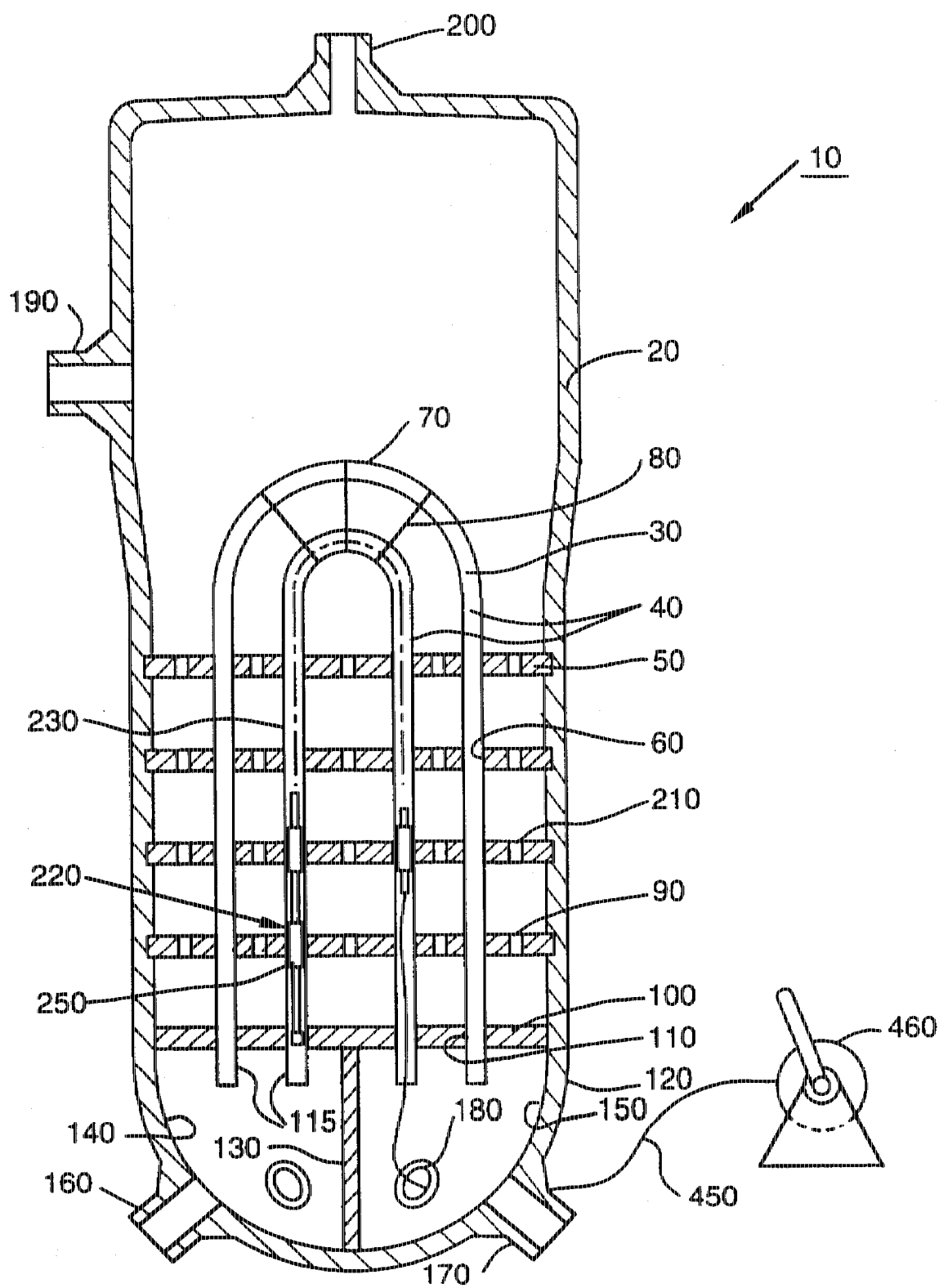
FIG. 1 shows in partial vertical section a nuclear steam generator with parts removed for clarity, the steam generator including a plurality of heat transfer tubes, a selected one of the tubes having a plurality of vibration attenuating assemblies disposed therein.

Referring to FIG. 1, there is shown a nuclear steam generator or heat exchanger, generally referred to as 10 and with parts removed for clarity. Steam generator 10 comprises a shell 20 in which is disposed a vertical steam generator tube bundle 30 defined by a plurality of vertical and inverted U-shaped heat transfer tubes 40. Disposed at various locations along the length of bundle 30 are a plurality of horizontal tube support plates 50 having holes 60 therethrough for receiving each tube 40, for laterally supporting tubes 40 and for reducing flow-induced vibration in tubes 40. Additional support for tubes 40 is provided in a U-bend region 70 thereof by a plurality of antivibration bars 80 for reducing flow-induced vibration in tubes 40. Antivibration bars 80 may be of the type disclosed in U.S. Pat. No. 4,653,567 issued Mar. 31, 1987 in the name of Hermann O. Lagally titled "Expandable Antivibration Bar For A Steam Generator" and assigned to the Westinghouse Electric Corporation.

As shown in FIG. 1, disposed in the lower portion of steam generator 10 and below a bottom-most support plate 90 is a horizontal tube sheet 100 having a plurality of transverse apertures 110 therethrough for receiving the ends 115 of tubes 40. Ends 115 of tubes 40 are affixed to tube sheet 100 by welding. Tube sheet 100 is attached to a hemispherical channel head 120. Disposed in channel head 120 is a vertical, semi-circular divider plate 130 sealingly attached to channel head 120 and tube sheet 100. Divider plate 130 divides channel head 120 into an inlet plenum chamber 140 and an outlet plenum chamber 150.

Still referring to FIG. 1, disposed on shell 20 below tube sheet 100 are a first inlet nozzle 160 and a first outlet nozzle 170 in communication with inlet plenum chamber 140 and outlet plenum chamber 150, respectively. A plurality of manway holes 180 are formed through shell 20 below tube sheet 100 for providing access to inlet plenum chamber 140 and outlet plenum chamber 150. Formed through shell 20 above tube bundle 30 is a second inlet nozzle 190 for allowing entry of secondary fluid into shell 20. A second outlet nozzle 200 is disposed on the top of shell 20 for exit of steam from steam generator 10.

During operation of steam generator 10, a heated and radioactive primary fluid (i.e., water) enters inlet plenum chamber 140 through first inlet nozzle 160 and flows through tubes 40 to outlet plenum chamber 150 where the primary fluid exits steam generator 10 through first outlet nozzle 170. The primary fluid may have a temperature of approximately 650 degrees Fahrenheit and a pressure of approximately 2250 pounds per square inch absolute (psia) and may attain a velocity at tube sheet 100 of approximately 15 feet per second and a velocity of 25 feet per second at U-bend portion 70.

In the simplified steam generator illustrated in FIG. 1, the secondary fluid (i.e., water) enters second inlet nozzle 190 and flows downwardly into heat transfer contact with tubes 40. The secondary fluid then vaporizes into steam due to the conductive heat transfer from the primary fluid to the secondary fluid through the walls of tubes 40. The steam flows upwardly through a plurality of holes 210 in support plates 50 and exits steam generator 10 through second outlet nozzle 200. The secondary fluid, which may attain a temperature of approximately 540 degrees Fahrenheit and a pressure of approximately 1000 psia may reach a cross-flow velocity across tube bundle 30 of approximately 25 feet per second. Such relatively high velocities of the primary and secondary fluids may cause flow-induced vibration in tubes 40, such as in U-bend region 70.

Again referring to FIG. 1, it will be appreciated that U-bend regions 70 of tube bundle 30 are tied together by the plurality of anti-vibration bars 80. The purpose of anti-vibration bars 80 is to limit vibration of tubes 40, particularly in U-bend regions 70. However, applicants have discovered that, although anti-vibration bars 80 perform their intended function, anti-vibration bars 80 nonetheless allow some vibration of some of the tubes 40. The vibration of tubes 40 against the surfaces of anti-vibration bars 80 may cause tube wall thinning in U-bend region 70. Continued vibration of such a thinned tube may lead to severe through-wall circumferential wear of the tube in the region of anti-vibration bars 80, which in turn could lead to severing of the tube and possible impact of the severed end of the tube against neighboring undamaged tubes. Therefore, if tube wall thinning is indicated in a tube, it is desirable to attenuate the vibration of the tube so that progressive thinning and ultimate severing of the tube is avoided.

Figure 2:
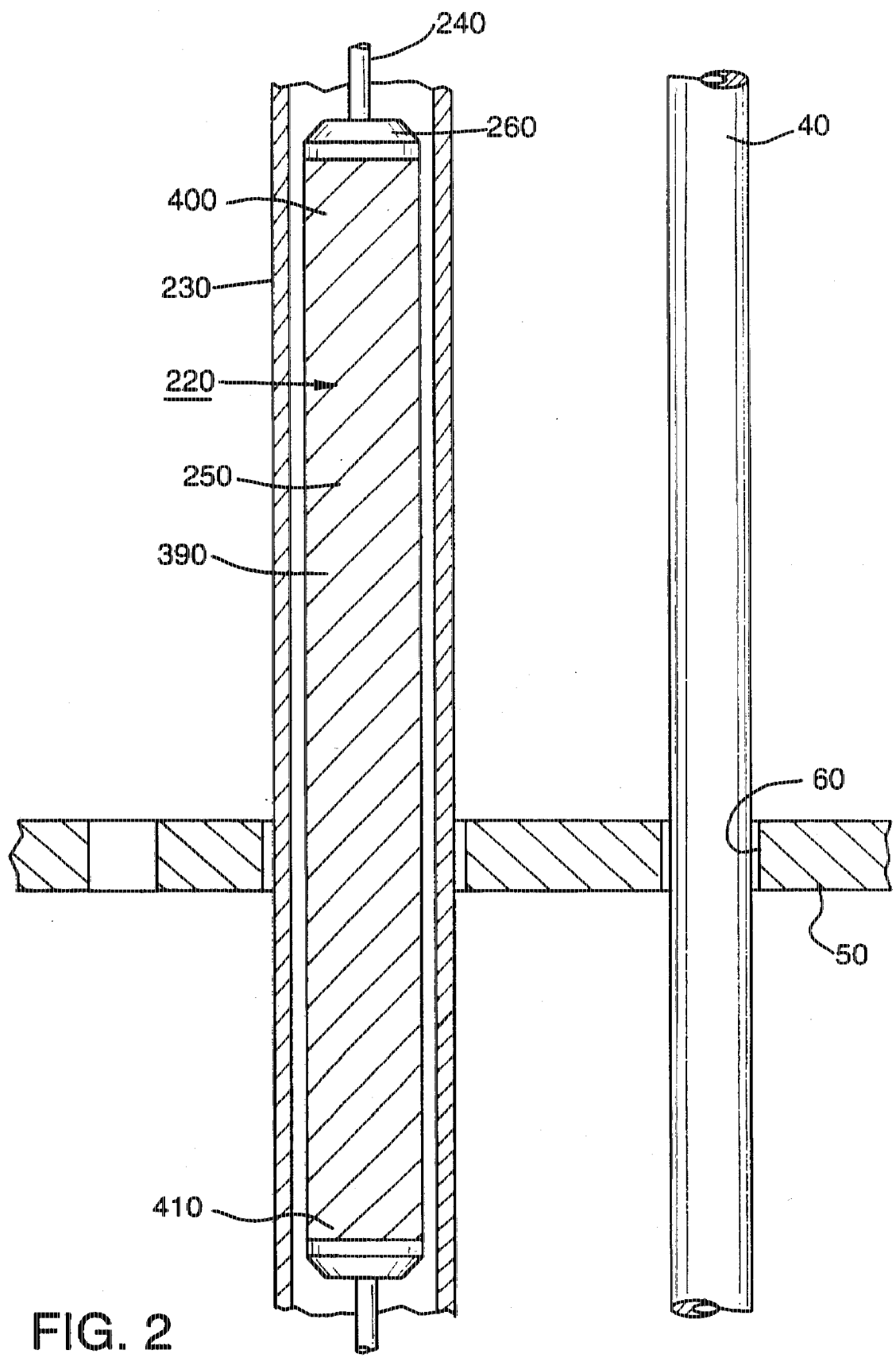
FIG. 2 shows in full one of the vibration attenuating assemblies disposed in the selected tube.

Therefore, referring to FIGS. 1 and 2, there is shown the subject matter of the present invention, which is an apparatus, generally referred to as 220, for attenuating vibration of a tubular member, such as a preselected tube 230 having tube wall thinning (not shown) in excess of a predetermined limit at a location along its length (e.g., in U-bend region 70). Apparatus 220 comprises a flexible cable 240 capable of being disposed in tube 230. Cable 240 maybe stainless steel for resisting corrosion. As described in more detail presently, a plurality of spaced-apart vibration attenuating assemblies 250 are mounted at predetermined locations along cable 240. For the typical "INCONEL 690" nuclear steam generator tube 230, each attenuating assembly 250 maybe 24 inches long and spaced along cable 240 at 25.5 inch intervals between the centers of assemblies 250. The number of attenuating assemblies 250 and the length of cable 240 required to satisfactorily damp and stabilize tube 230 will depend on the overall length of U-bend region 70. This is so because the plurality of U-bend regions 70 have varying radii and associated arc lengths. For example, the radii and arc lengths of U-bend regions 70 for the outer-most rows of tubes 40 will be greater than the radii and arc lengths of U-bend regions 70 for the inner-most rows of tubes 40.

Figure 3:
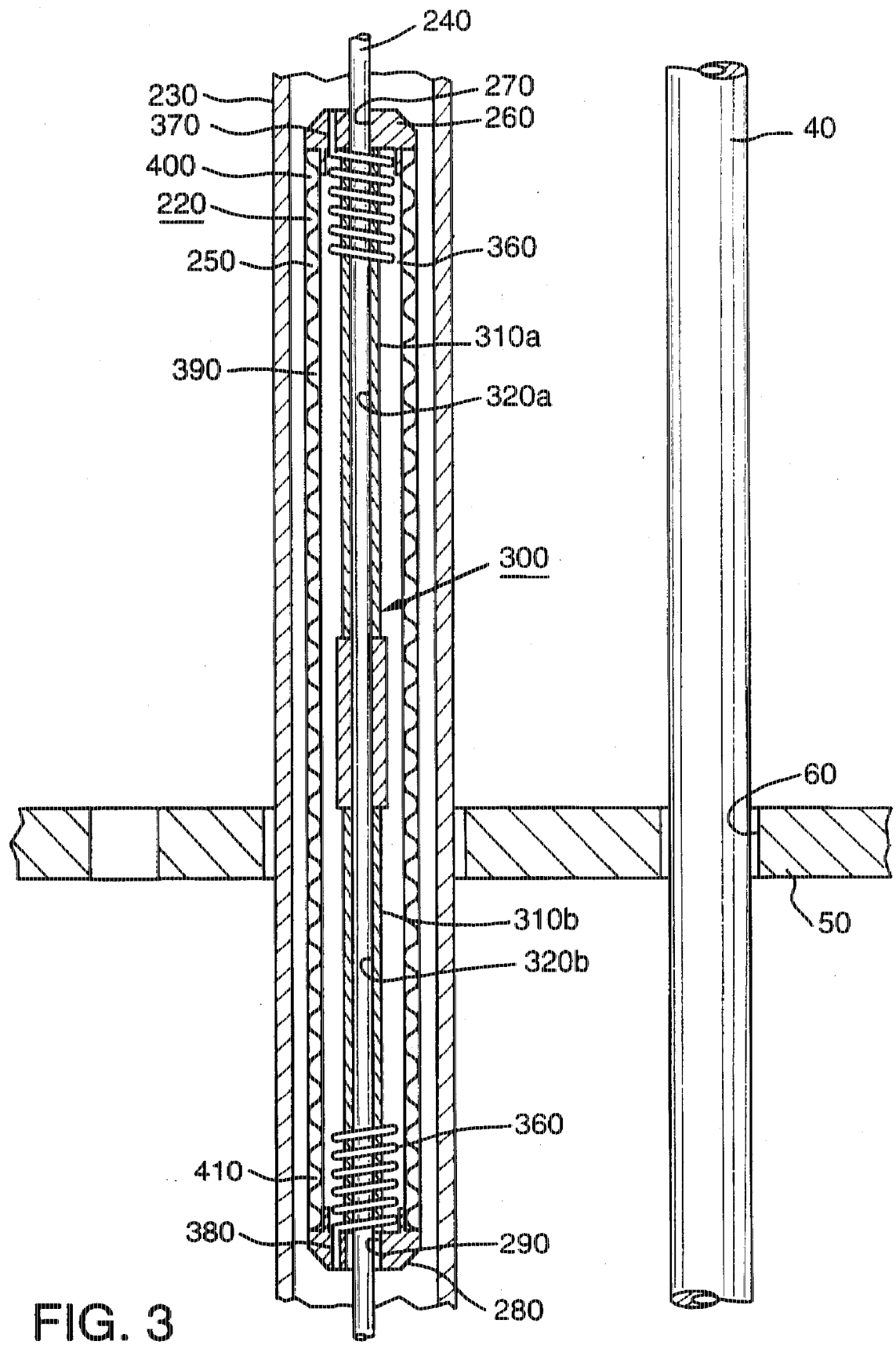
FIG. 3 shows in vertical section the vibration attenuating assembly disposed in the selected tube, the vibration attenuating assembly having a heat vaporizable portion.
Figure 4:
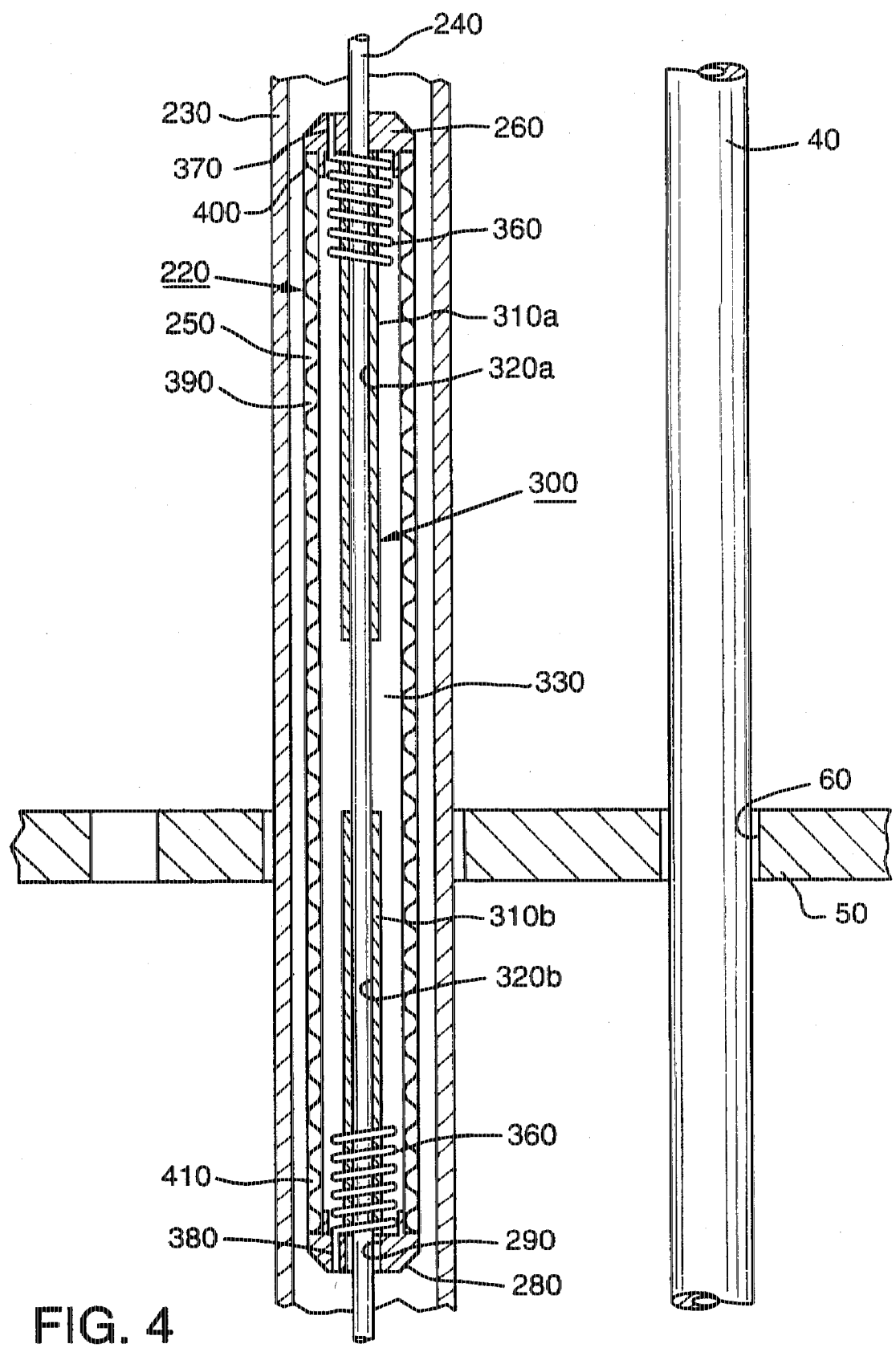
FIG. 4 shows in vertical section the vibration attenuating assembly immediately after the vaporizable portion thereof has vaporized.

Referring now to FIGS. 2, 3 and 4, each attenuating assembly 250 includes a generally disc-shaped first end fitting 260 mounted on and encircling cable 240. First end fitting 260, which is affixed to cable 240, such as by being silvered soldered thereto, has a transverse center hole 270 for allowing cable 240 to extend through first end fitting 260. Moreover, first end fitting 260 may have a tapered or cone-shape transverse cross-section, as shown, for allowing ease of entry by assembly 250 into end 115 of tube 230. For reasons disclosed hereinbelow, spaced-apart from first end fitting 260 is a disc-shaped second end fitting 280 which encircles and is slidably mounted on cable 240. Second end fitting 280 has a transverse center hole 290 for allowing cable 240 to extend therethrough. For reasons disclosed in more detail hereinbelow, second end fitting 280 is not attached to cable 240; rather, second end fitting 280 is slidable on cable 240.

Still referring to FIGS. 2, 3 and 4, attenuating assembly 250 further includes heat vaporizable spacer means, such as a generally cylindrical and elongate heat vaporizable spacer, generally referred to as 300, for maintaining first end fitting 260 and second end fitting 280 in their spaced-apart relationship until a predetermined portion of spacer 300 melts or vaporizes. In this regard, spacer 300 is interposed between first end fitting 260 and second end fitting 280 to separate first end fitting 260 and second end fitting 280. More specifically, spacer 300 comprises a spacer tube, which maybe stainless steel for resisting corrosion, bifurcated into two spaced-apart and elongate spacer tube portions 310a and 310b. Spacer tube portion 310a is attached at an end thereof to first end fitting 260 and spacer tube portion 310b is attached at an end thereof to second end fitting 280. Moreover, each spacer tube portion 310a and 310b has a central bore 320a and 320b, respectively, for passage of cable 240 therethrough. Therefore, each spacer tube portion 310a/310b surrounds cable 240. It will be appreciated from the description hereinabove, that in the preferred embodiment of the invention, the bifurcated structure of spaced-apart spacer tubes 310a and 310b define a space 330 (see FIG. 4) therebetween for receiving a heat vaporizable tubular spacer insert 340. Spacer insert 340 has a bore 350 for passage of cable 240 therethrough. Spacer insert 340 is made of a heat vaporizable material, which maybe a polymer such as polypropylene or the like. Insert 340 melts or vaporizes as the secondary fluid circulating around the exterior of tube 230 reaches its nominal operating bulk temperature of approximately 600 degrees Fahrenheit.

Figure 5:
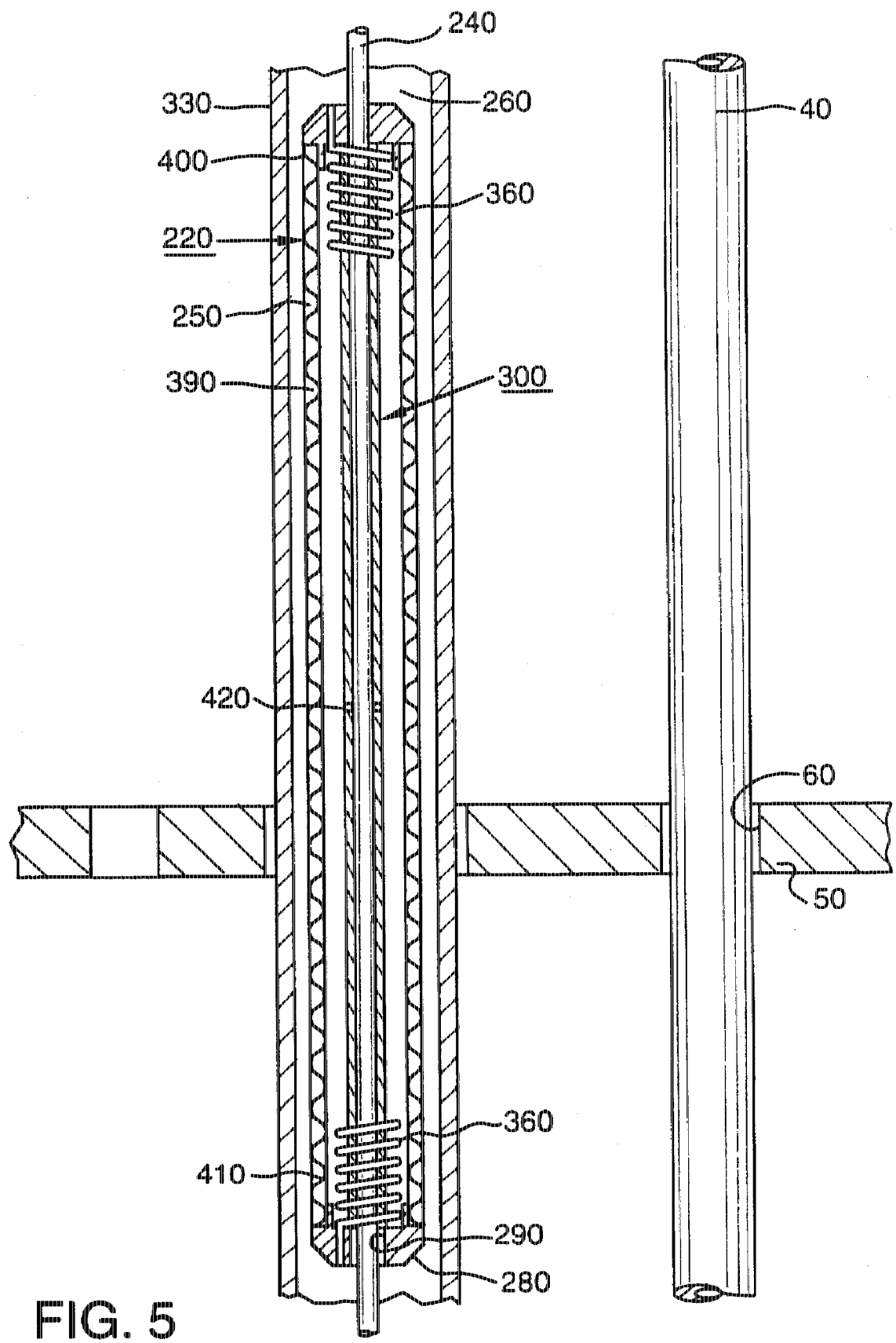
FIG. 5, shows in vertical section the vibration attenuating assembly a substantial time after the vaporizable portion thereof has vaporized.

Referring to FIGS. 3, 4 and 5, biasing means, which maybe an elongate, preloaded, helical coil spring 360 surrounds spacer tubes 310a/310b and spacer insert 340. Spring 360 extends from first end fitting 260 to second end fitting 280 and has a multiplicity of coils defined by its helical configuration for providing frictional damping of tube 230. In this regard, spring 360 has a first end 370 attached, such as by means of silver soldering, to first end fitting 260 and a second end 380 attached, such as by means of silver soldering, to second end fitting 280. Spring 360 is capable of providing a preload force (e.g., less than approximately two pounds-force) acting on first end fitting 260 and second end fitting 280 in such a manner that it tends to bias second end fitting 280 towards first end fitting 260. However, it will be understood from the disclosure hereinabove that spacer tubes 310a/310b in combination with spacer insert 340 will keep first end fitting 260 and second end fitting 280 in their predetermined spaced-apart relationship until spacer insert 340 melts or vaporizes. After insert 340 vaporizes, second end fitting 280 will move towards first end fitting 260 so as to close space 330, for reasons disclosed hereinbelow.

As best seen in FIGS. 2 and 3, each assembly 250 further comprises a generally cylindrical flexible braided sheath 390 surrounding spring 360 and interposed between first 16 end fitting 260 and second end fitting 280. Sheath 390 is preferably braided wire for providing a multiplicity of locations for frictional damping to occur between the wires themselves, between the wires and the interior structures (e.g., spring 360) of attenuating assembly 250, and between the wires and the inner wall of tube 230. Sheath 390 has a first end portion 400 attached, such as by silver soldering, to first end fitting 260 and a second end portion 410 attached, such as by silver soldering, to second end fitting 280.

Figure 5A:
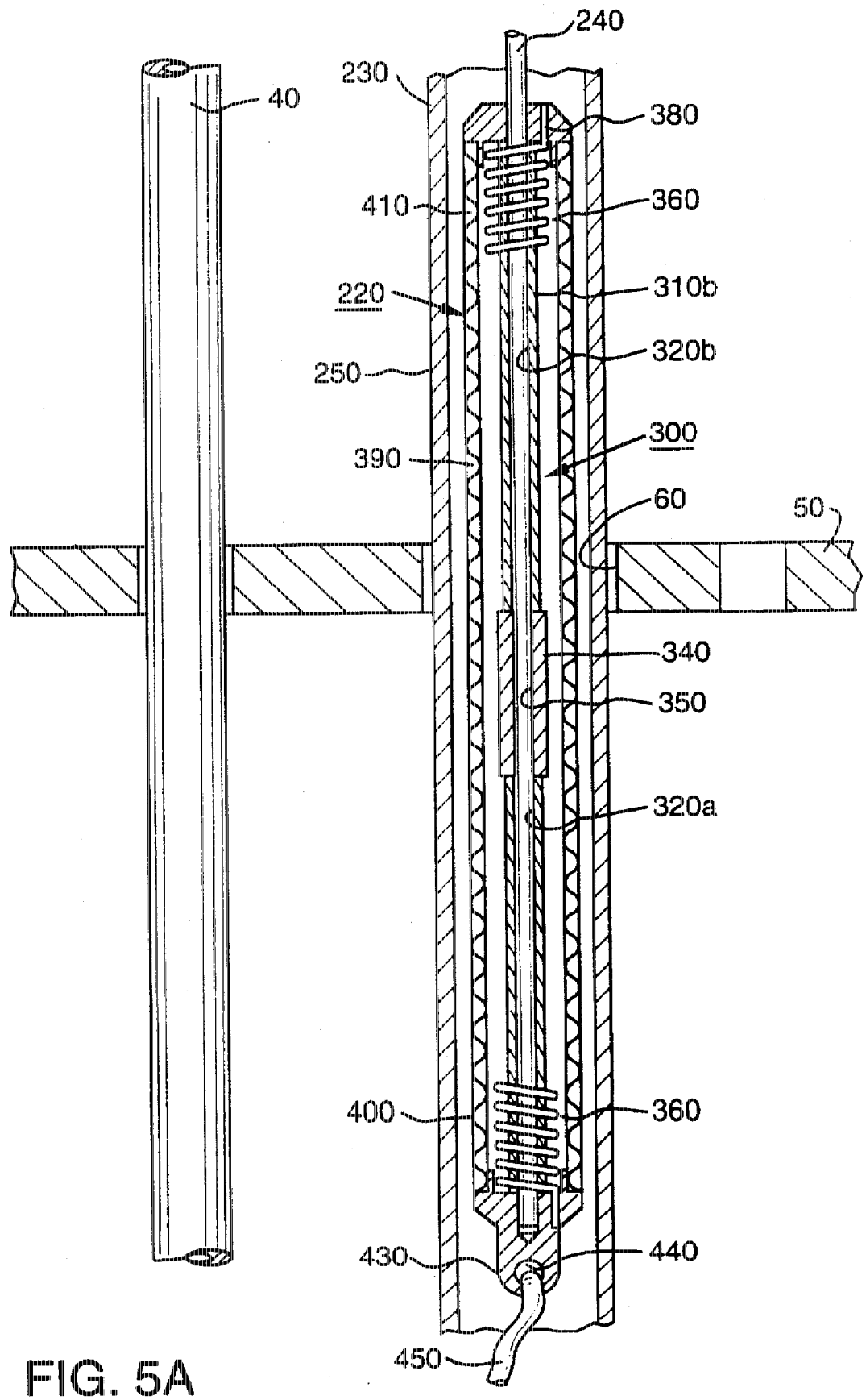
FIG. 5A shows in vertical section an end of one of the vibration attenuating assemblies being towed by a cord connected thereto.

Referring to FIGS. 5 and 5A, immediately after the spacer insert 340 vaporizes, space 330 is created; however, preloaded spring 360 will tend tom ore first end fitting 260 and second end fitting 280 closer together because first end 370 and second end 380 of spring 360 are attached to first end fitting 260 and second end fitting 280, respectively. This is so because as preloaded spring 360 exerts a pulling force on second end fitting 280, second end fitting 280 will slide on cable 240 towards first end fitting 260. Second end fitting 280 will slide on cable 240 because hole 290 formed through second end fitting 280 slidably receives cable 240. As second end fitting 280 moves towards first end fitting 260 due to the biasing action of spring 360, space 330 will close so that the free ends of spacer tubes 310a/310b will contact to define an interface 420 therebetween, as shown in FIG. 5A. In this manner, the axial dimension of sheath 390 will shorten a predetermined amount equal to the length of insert 340 as second end fitting 280 moves towards first end fitting 260. Of course, the radial dimension of sheath 390 will increase as the axial dimension of sheath 390 decreases. More specifically, the radial dimension of sheath 390 will increase until the exterior surface of sheath 390 contacts the inner wall of tube 230.

Referring to FIGS. 1 and 5A, an end one of assemblies 250 may include an integrally attached tow bar 430 having a hole 440 therethrough for receiving a flexible cord 450 capable of towing apparatus 220 into position within tube 230. In this regard, apparatus 220 will be towed so that it drapes U-bend region 70, as shown in FIG. 1. Cord 450 extends from tow bar 430, through manway hole 180 and may be connected to a motorized take-up reel for pulling cord 450 during installation of apparatus 220 within tube 230.

Figure 6:
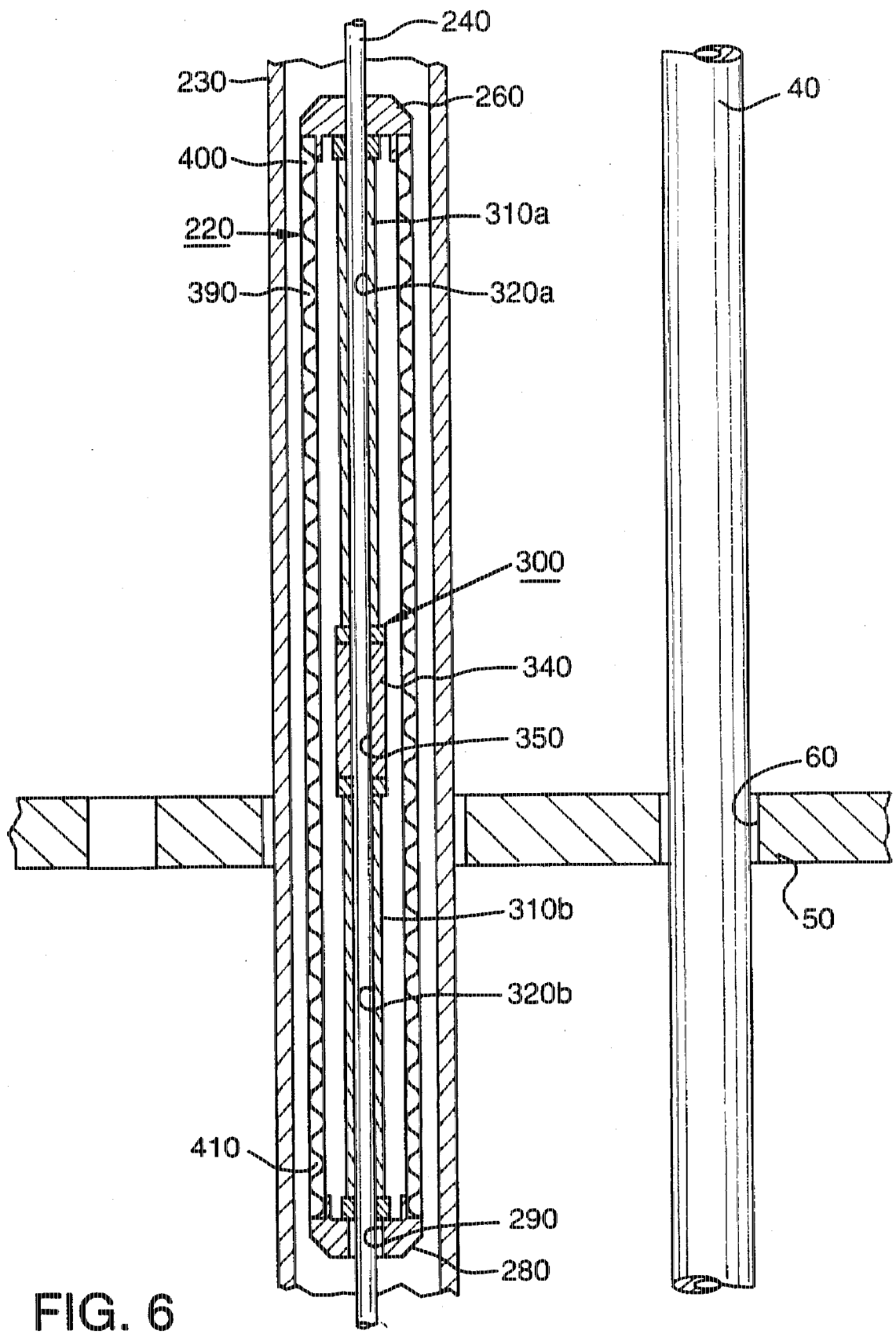
FIG. 6 shows in vertical section an alternative embodiment of the vibration attenuating assembly.

FIG. 6 shows an alternative embodiment of the invention. In this alternative embodiment of apparatus 220, spring 360 has been shown in part and "filler material" 361 (e.g., wire mesh, wire strands, or the like) has been added between spacer tubes 310a/310b and sheath 390 and also added between spacer insert 340 and sheath 390 to provide increased damping of tube 230. This alternative embodiment of the invention provides increased damping, when compared to the preferred embodiment.

Figure 7:
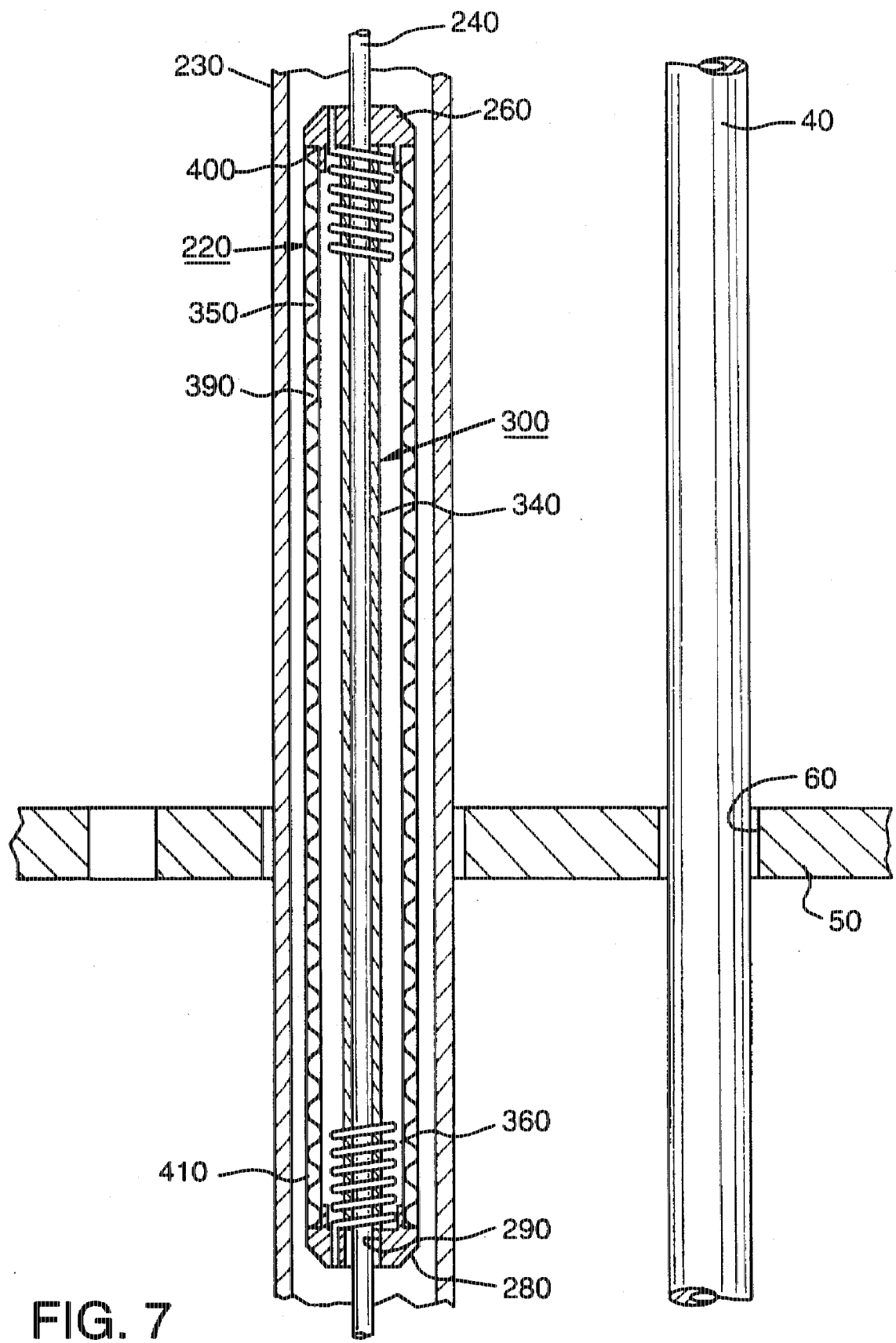
FIG. 7 shows in vertical section another alternative embodiment of the vibration attenuating assembly.

FIG. 7 shows another alternative embodiment of the invention. In this alternative embodiment of apparatus 220, spacer tubes 310a/310b have been deleted and tubular spacer insert 340 has been elongated and substituted for spacer tubes 310a/310b. An advantage of this alternative embodiment is that it allows maximum shortening of sheath 390 when insert 340 vaporizes, which in turn provides maximum radial expansion of sheath 390 in order to accommodate tubes of larger inside diameter.

During installation of apparatus of 220, attenuating assemblies 250 and cable 240 are inserted into tube 230 and draped over U-bend region 70 by means cord 450 and take-up reel 460. Next, ends 115 of tube 230 are preferably plugged. At this point, steam generator 10 maybe returned to service. As steam generator is returned to service, the heated primary fluid flowing through the unplugged tubes heats the secondary fluid to its operating temperature. The secondary fluid, which surrounds tube 230, heats spacer insert 340 to its vaporization or melting temperature. As insert 340 melts or vaporizes, space 330 is created. However, space 330 will thereafter close due to the biasing action of spring 360 which biases second end fitting 280 towards first end fitting 260. As second end fitting 280 moves towards first end fitting 260, the unattached end of spacer tube 310b moves into abutment with the unattached end of spacer tube 310a to close space 330. Of course, as space 330 closes, flexible braided sheath 390 axially shortens but radially expands to contact the inner wall of tube 230. The braids of braided sheath 390 frictionally interact with themselves and the inner wall of tube 230 to damp vibration of tube 230. Moreover, spring 360 and spacer tubes 310a/310b will also frictionally interact (through sheath 390) with the inner wall of tube 230 to damp vibration of tube 230.

In addition to its damping function, apparatus 220 tends to limit motion of both parts of tube 230, should tube 230 sever due to circumferential through-wall wear. The plurality of assemblies 250 that are linked by means of cable 240 effectively tie the severed tube ends together, thereby limiting (stabilizing) potential motion of vibration of the severed tube ends. In this manner, the severed tube ends will not excessively laterally move to impact neighboring undamaged tubes.

Figure 8:
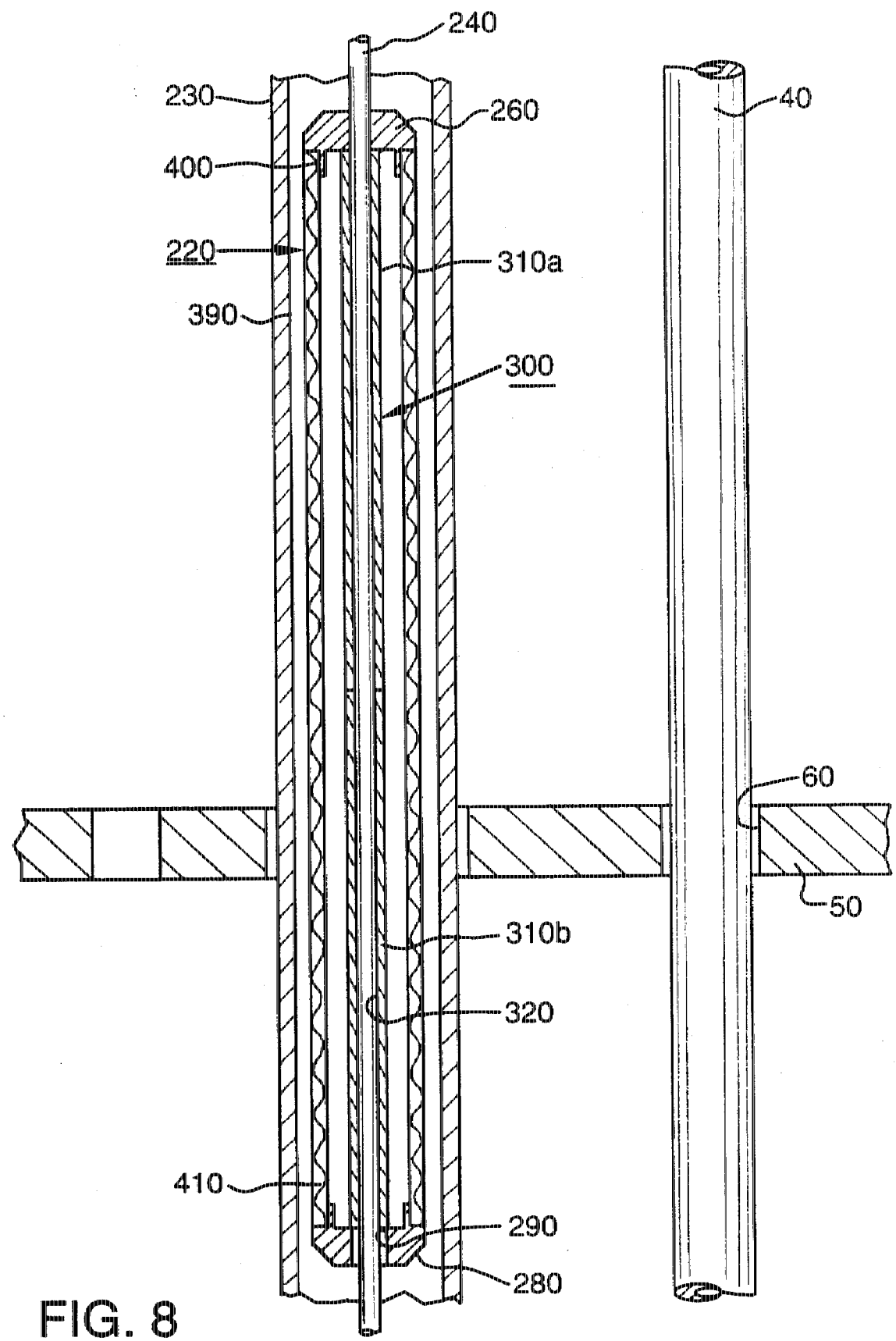
FIG. 8 shows in vertical section yet another alternative embodiment of the vibration attenuating assembly.

Referring to FIG. 8, there is shown yet another alternative embodiment of the invention. In this embodiment, insert 340 and spring 360 have been deleted and only flexible braided sheath 390 and spacer tubes 310a/310b are relied upon to frictionally interact with tube 230 to stabilize and damp vibration of tube 230.

It will be appreciated from the disclosure hereinabove that an advantage of the present invention is that the presence of spacer tubes 310a/310b and heat vaporizable spacer insert 340 allows the outside diameter of sheath 390 to be substantially less than the inside diameter of tube 230, so that assembly 250 easily inserts into tube 230. After spacer insert 340 vaporizes, which occurs when steam generator 10 approaches its operating temperature, sheath 390 radially expands and contacts tube 230 to provide damping stabilization.

While there has been described what at present is considered to be the preferred structure and alternative embodiments of the preset invention, it is to be understood that various modifications and alterations maybe made therein without departing from the true spirit and scope of the present invention, which scope is intended to be covered in the claims appended hereto.

Therefore, what is provided is an apparatus for attenuating vibration of a tubular member, which tubular member maybe be a heat transfer tube belonging to a nuclear steam generator.

What is claimed is:

1. Apparatus for attenuating vibration of a tubular member having an inner wall, comprising:
   (a) a cable capable of being disposed in the tubular member;
   (b) a first end fitting mounted on said cable;
   (c) a second end fitting mounted on said cable and spaced-apart from said first end fitting;
   (d) biasing means attached to said first end fitting and said second end fitting for biasing said first end fitting and said second end fitting closer together;
   (e) spacer means for spacing said fittings; and
   (f) a flexible braided sheath attached to said first end fitting and said second end fitting, said sheath surrounding said biasing means and said spacer means, whereby said biasing means biases said first end fitting and said second end fitting closer together, whereby said sheath axially shortens and radially expands to engage the inner wall of the tubular member as said first end fitting and said second end fitting are biased closer together, and whereby vibration of the tubular member is attenuated as the braids of said sheath engage the inner wall of the tubular member.

2. Apparatus for attenuating vibration of a tubular member having an inner wall, comprising:
   (a) a cable capable of being disposed in the tubular member;
   (b) a first end fitting mounted on said cable;
   (c) a second end fitting mounted on said cable and spaced-apart from said first end fitting;
   (d) heat vaporizable spacer means interposed between said first end fitting and said second end fitting for maintaining said first end fitting and said second end fitting in a spaced-apart relationship;
   (e) biasing means attached to said first end fitting and said second end fitting for biasing said first end fitting and said second end fitting closer together; and
   (f) a flexible sheath attached to said first end fitting and said second end fitting, said sheath surrounding said biasing means and said spacer means, whereby said spacer means vaporizes as said spacer means is heated, whereby said biasing means biases said first end fitting and said second end fitting closer together as said spacer means vaporizes, whereby said sheath axially shortens and radially expands to engage the inner wall of the tubular member as said first end fitting and said second end fitting are brought closer together, and whereby vibration of the tubular member is attenuated as said sheath engages the inner wall of the tubular member.

3. The apparatus of claim 2, wherein said spacer means is polypropylene having a predetermined vaporization temperature.

4. The apparatus of claim 2, wherein said biasing means is a helical spring.

5. The apparatus of claim 2, wherein said sheath is braided for providing a multiplicity of locations to frictionally engage the inner wall of the tubular member.

6. The apparatus of claim 2, further comprising filler material of predetermined mass interposed between said spacer means and said sheath for damping vibration of the tubular member.

7. Apparatus for attenuating vibration of a vibrating tube having an inner wall, comprising:
   (a) a cable capable of being disposed in the tube;
   (b) a first end fitting mounted on and encircling said cable;
   (c) a second end fitting slidably mounted on and encircling said cable, said second end fitting spaced-apart from said first end fitting;
   (d) heat vaporizable spacer means interposed between said first end fitting and said second end fitting for maintaining said first end fitting and said second end fitting in a spaced-apart relationship;
   (e) a helical spring attached to said first end fitting and said second end fitting and interposed therebetween for biasing said first end fitting and said second end fitting closer together, said spring surrounding said spacer means;
   (f) a braided flexible sheath attached to said first end fitting and said second end fitting and surrounding said spring, whereby said spacer means vaporizes as said spacer means is heated, whereby said spring biases said first end fitting and said second end fitting closer together as said spacer means vaporizes, whereby said sheath axially shortens and radially expands to engage the inner wall of the tube as said first end fitting and said second end fitting are brought closer together, and whereby vibration of the tube is attenuated as said sheath engages the inner wall of the tube.

8. The apparatus of claim 7, wherein said spacer means is polypropylene having a predetermined vaporization temperature.

9. The apparatus of claim 7, further comprising compressible filler material of predetermined mass interposed between said spacer means and said sheath for damping vibration of the tube.

10. For use in a nuclear heat exchanger having a vibrating heat transfer tube therein having an inner wall, apparatus for attenuation vibration of the tube, comprising:
    (a) a cable capable of being disposed in the tube;
    (b) a plurality of spaced-apart vibration attenuating assemblies mounted on said cable, each of said assemblies including:
       (i) a first end fitting mounted on and encircling said cable;
       (ii) a second end fitting slidably mounted on and encircling said cable, said second end fitting spaced-apart from said first end fitting;
       (iii) an elongate heat vaporizable spacer interposed between said first end fitting and said second end fitting for maintaining said first end fitting and said second end fitting in a spaced-apart relationship;
       (iv) a helical spring attached to said first end fitting and said second end fitting and interposed therebetween for biasing said first end fitting and said second end fitting closer together, said spring surrounding said spacer;
       (v) a braided flexible sheath having end portions respectively attached to said first end fitting and said second end fitting and surrounding said spring, whereby said spacer vaporizes as said spacer is heated, whereby said spring biases said second end fitting slidably along said cable towards said first end fitting to bring said first end fitting and said second end fitting closer together as said spacer vaporizes, whereby said sheath axially shortens and radially expands to engage the inner wall of the tube as said first end fitting and said second end fitting are brought closer together, and whereby vibration of the tube is attenuated as said sheath frictionally engages the inner wall of the tube.

11. The apparatus of claim 10, wherein said spacer is polypropylene having a predetermined vaporization temperature.

12. The apparatus of claim 10, further comprising compressible filler material of predetermined mass interposed between said spacer and said sheath for damping vibration of the tube.

13. The apparatus of claim 12, wherein said filler material is wire mesh.

* * * * *